United States Patent [19]

DiFilippo et al.

[11] Patent Number: 4,892,281

[45] Date of Patent: Jan. 9, 1990

[54] GENERIC BEVERAGE CONTAINER HOLDER

[75] Inventors: Michael DiFilippo, Royal Oak; David N. Grabowski, Rochester Hills, both of Mich.

[73] Assignee: Chivas Products Limited, Sterling Heights, Mich.

[21] Appl. No.: 138,988

[22] Filed: Dec. 29, 1987

Related U.S. Application Data

[63] Continuation-in-part of Ser. No. 4,994, Jan. 20, 1987, Pat. No. 4,738,423.

[51] Int. Cl.$^4$ .............................................. F16M 13/00
[52] U.S. Cl. .............................. 248/311.2; 248/240.1; 248/316.4
[58] Field of Search ................... 248/311.2, 312.1, 310, 248/312, 313, 316.1, 316.4, 240.1, 316.2, 316.6; 211/76, 74, 77; 297/194, 188; 108/25, 26, 44, 45

[56] References Cited

U.S. PATENT DOCUMENTS

| | | | |
|---|---|---|---|
| 3,606,112 | 9/1971 | Cheshier | 108/45 X |
| 1,301,913 | 4/1919 | Corby | |
| 3,083,998 | 4/1963 | Morris | |
| 3,497,076 | 2/1970 | O'Brien | |
| 3,637,184 | 1/1972 | O'Brien | 248/311.2 X |
| 3,784,142 | 1/1974 | O'Brien | 248/311.2 |
| 3,899,982 | 8/1975 | Fetzek | 108/25 |
| 4,040,659 | 8/1977 | Arnold | |
| 4,417,764 | 11/1983 | Marcus et al. | 108/44 X |
| 4,738,423 | 4/1988 | DiFilippo | 248/311.2 |

FOREIGN PATENT DOCUMENTS 750760 1/1945 Fed. Rep. of Germany ...... 248/310

Primary Examiner—Ramon S. Britts
Assistant Examiner—Karen J. Chotkowski
Attorney, Agent, or Firm—Townsend and Townsend

[57] ABSTRACT

A generic beverage container holder for use within a vehicle includes a housing mountable beneath the dashboard and a frame slidably mounted to the housing for movement between retracted and operational positions. An opening is defined within the frame to accommodate beverage containers such as cans and cups. A U-shaped support is pivotally mounted to and beneath the frame and is spring biased towards a vertical attitude beneath the container opening when the frame is extended. When the frame is retracted the support automatically folds against the frame for storage. The frame consists of two telescoping elements moving between extended and collapsed conditions as the frame moves between the operational and retracted positions. The frame is about as long as the housing is deep when retracted, but is substantially longer when operational. This results in a reduced-depth housing usable where space is limited.

17 Claims, 3 Drawing Sheets

U.S. Patent   Jan. 9, 1990   Sheet 1 of 3   4,892,281
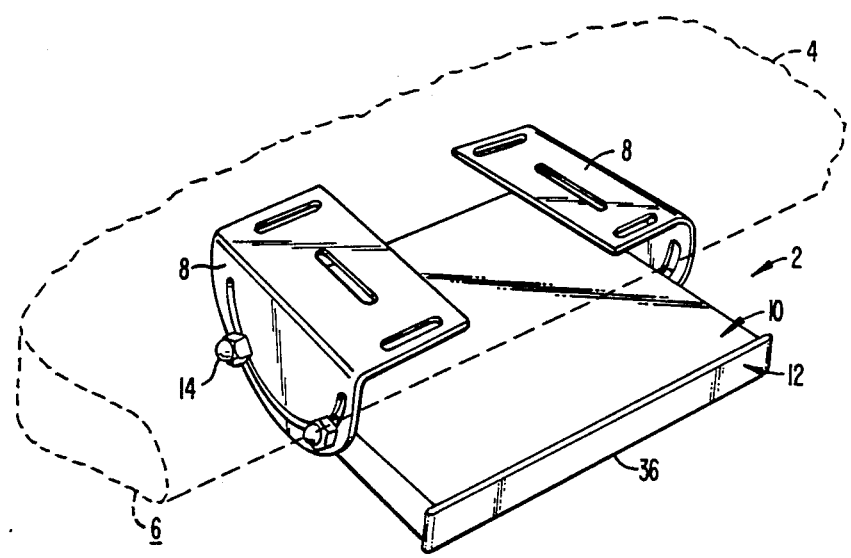
FIG._1.
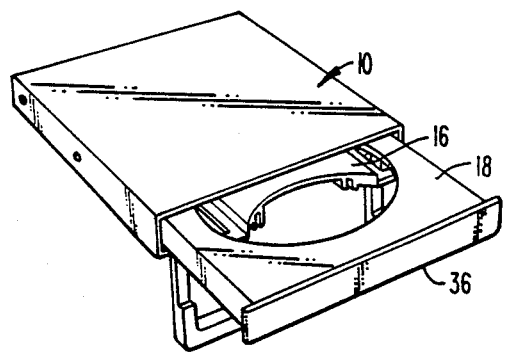
FIG._2A.
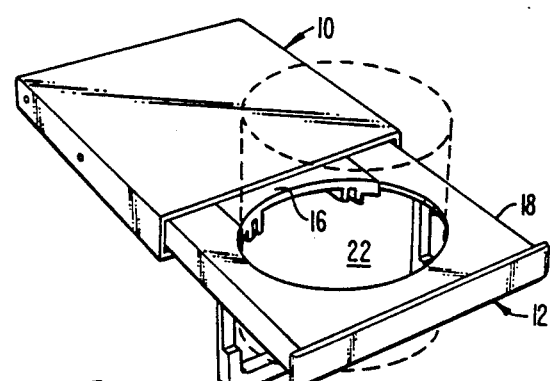
FIG._2B.

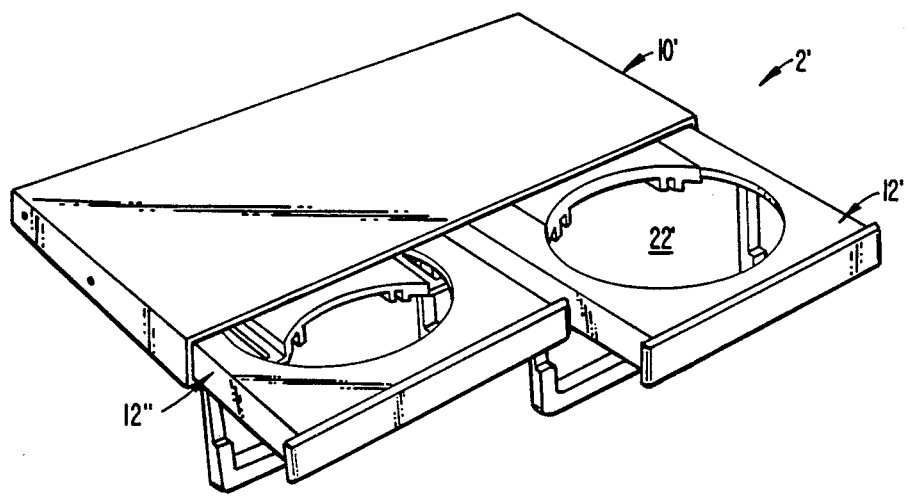
FIG._7.
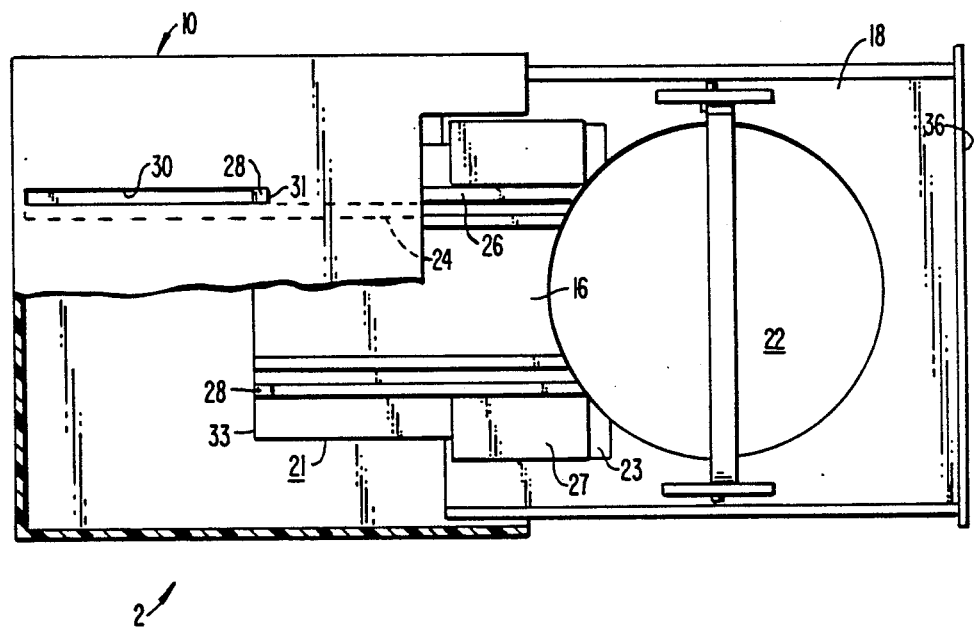
FIG._3.

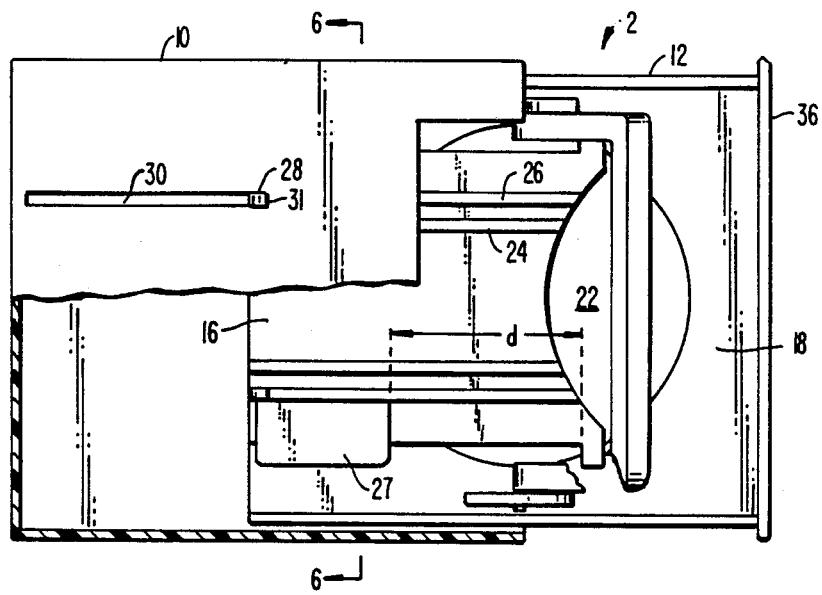
FIG._4.
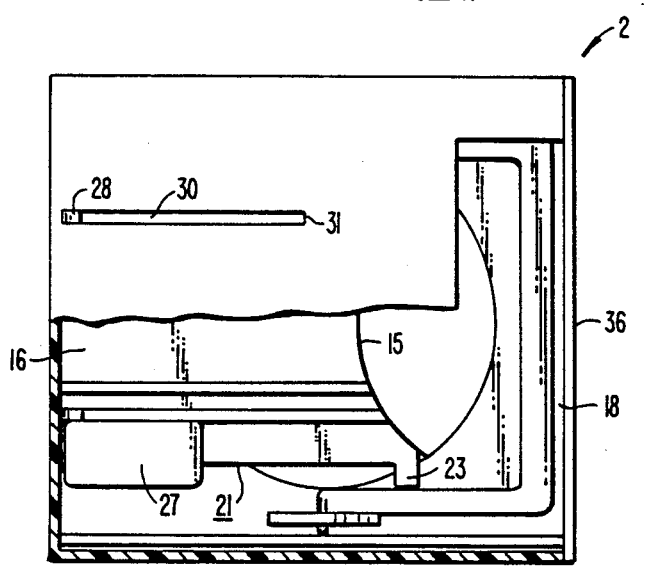
FIG._5.
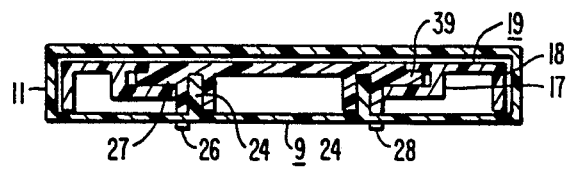
FIG._6.

GENERIC BEVERAGE CONTAINER HOLDER

This application is a continuation-in-part of U.S. patent application Ser. No. 004,994 filed on Jan. 20, 1987, now U.S. Pat. No. 4,738,423.

BACKGROUND OF THE INVENTION

Both drivers and passengers often drink beverages while in a motor vehicle. One constant problem is where to put the cup, mug, can or other beverage container. Some automobiles have horizontal surfaces which can be used to support a beverage container. However, while the vehicle is in motion such a perch can be less suitable.

In response to this, numerous devices have been developed to properly support a beverage container, especially while the vehicle is in motion. Some of these are in the form of a circular basket with a generally U-shaped lip at the top which engages the window opening. Others are meant to be supported on the floor of the vehicle, typically on the drive shaft hump. These floor-supported container supports have the obvious disadvantage of being in the way when not needed. Many holders are manufactured to accommodate a conventional soft drink can. Therefore even with conventional beverage container holders, the user is often left with no satisfactory place for his or her beverage container. The parent application referred to above addresses many of these problems; however, in some automobiles, there is insufficient room under the dashboard for mounting the housing.

SUMMARY OF THE INVENTION

The present invention is directed to a generic beverage container holder, particularly suited for use with motor vehicles having limited depth beneath the dashboard, which retracts out of the way when not needed.

The generic container holder includes a housing mountable to a support surface and a frame movably mounted to the housing. The housing is typically mounted within an opening in the instrument panel or a center console of a motor vehicle. It could also be mounted to a support surface at the underside of the dashboard of the motor vehicle. The housing and frame are preferably slidably mounted to one another so that the frame is out of sight when in its retracted, storage position within the housing. When the frame is pulled to its extended operational position, the frame exposes a container receiving opening. The opening defined by the frame is typically circular to accommodate conventional soft drink cans, paper or plastic cups and so forth. It could also be configured to accept protruding handles as are found on coffee mugs.

The frame consists of two telescoping elements moving between extended and collapsed conditions as the frame moves between the operational and retracted positions. When the frame is in its retracted position, both telescoping elements are within the housing. When the frame is in its operational position, at least one of the telescoping elements is at least partially removed from the housing. The frame, in the preferred embodiment, is about as long as the housing is deep when in the retracted position, but is substantially longer when in the operational position. The invention can be mounted where space is limited and yet retain its cantilever strength when extended.

In the preferred embodiment, a U-shaped container support is pivotally mounted to and is suspended from the frame. The U-shaped support is spring biased to assume a generally vertical attitude so that the bight of the U is positioned beneath the container opening when the frame is in the extended, operational position. When the frame is moved to its retracted position, the U-shaped support automatically folds into the frame for compact storage.

Other features and advantages of the invention will appear from the following description in which the preferred embodiments have been set forth in detail in conjunction with the accompanying drawings.

BRIEF DESCRIPTION OF THE DRAWINGS

FIG. 1 is a perspective view of a generic container holder shown in the retracted, storage position and mounted beneath the dashboard of a vehicle, the dashboard shown in dashed lines.

FIG. 2A is a perspective view of the container holder of FIG. 1 in its partially retracted position.

FIG. 2B is a perspective view of the container holder of FIG. 1 in the extended, use position with a container shown in dashed lines.

FIG. 3 is a partial cross-sectional bottom view of the embodiment of FIG. 2B.

FIG. 4 is a partial cross-sectional bottom view of the embodiment of FIG. 2A.

FIG. 5 is a partial cross-sectional bottom view of the embodiment of FIG. 1.

FIG. 6 is a cross-sectional view taken through line 6—6 of FIG. 4.

FIG. 7 is a perspective view of an alternate embodiment of the present invention.

DETAILED DESCRIPTION OF THE PREFERRED EMBODIMENTS

Referring now to the drawings. FIG. 1 illustrates the generic beverage container holder 2 shown positioned beneath dashboard 4 of a motor vehicle (not shown) as it would be mounted to the downwardly facing support surface 6 of dashboard 4. Generic container holder 2 includes pivot brackets 8 mounted to the downwardly facing support surface 6 a housing 10, and a frame 12. By adjusting acorn nuts 14 on pivot brackets 8, the desired angular inclination of housing 10 can be achieved.

Referring now also to FIGS. 2A and 2B, frame assembly 12 includes a first and second telescoping members 16, 18 slidably mounted to housing 10 to move between a retracted position, as shown in FIG. 1, and its extended position, as shown in FIG. 2B, in which a container 20 is received in a central open area 22 of frame 12. Central open area 22 is formed between first telescoping member 16 and second telescoping member 18 of frame 12. Approximately two-thirds of the circumference bounding central open area 22 is formed in second telescoping member 18. The remaining one-third of the circumference bounding central open area 22 is formed in first telescoping member 16.

Broadly, housing 10 and frame 12 include complementary guides, described below, to insure proper sliding movement of first and second telescoping members 16, 18 within housing 10. Side walls 11 of housing 10 also engage lateral edges 37 of frame 12 to help guide movement of frame 12 to its proper position.

Housing 10 includes a pair of parallel upstanding guides 24 (see FIG. 6) on the bottom surface 9 of the housing. A pair of slots 30 are formed in bottom surface 9 adjacent and to the outside of guides 24. First telescoping member 16 includes two pairs of downwardly extending outer and inner guides 26, 29 which are positioned on either side of and cooperate with upstanding guides 24. Outer guides 26 have extensions which act as guide pins 28 at the rear ends 33 of outer guides 26. Guide pins 28 extend into slots 30 and are slidable in the slots. Guide pins 28 and slots 30, as well as guides 24, 26 and 29, act to align frame 12 as it moves from its retracted to its operational position. Guide pins 28 contact the ends 31 of slots 30 when frame assembly 12 is in its fully extended position; this prevents first telescoping member 16 from sliding any farther.

First telescoping member 16 has a pair of L-shaped flanges 27 positioned to capture the lateral edge 17 of second telescoping member 18 between legs 39 of flange 27 and upper surface 19 of member 18. The ends 40 of legs 39 are positioned adjacent guides 29 to further guide the relative movements of first and second telescoping members 16, 18. Member 16 has a pair of stops 23 which extend laterally from edge 21 at the forward end 15 of member 16. Stops 23 cooperate with an end of flanges 27 to prevent member 18 from sliding off of member 16 when member 18 is pulled from housing 10. Thus, the movement of second telescoping member 18 is guided by the cooperation of flange 27, guides 24, 26 and 29, edge 17, side walls 11 and edges 21 and is limited by its engagement of guide pins 28 and stops 23 with ends 31 of slots 30 and flanges 27.

Frame 12 has a lengthwise dimension which is longer when the frame is in its operational position than it is when the frame is in its retracted position. The length of housing 10 is substantially shorter than the length of frame 12 when first and second telescoping members 16, 18 are in their extended conditions. When first and second telescoping members 16, 18 are in their collapsed conditions, the frame is housed substantially within housing 10.

A U-shaped bottom support 38 is pivotally mounted to frame 12 at pivots 34 to move between a generally vertically oriented support position as shown in FIGS. 2B and 3 and a generally horizontal collapsed position as shown in FIGS. 1 and 5. Bottom support 38 lies adjacent frame 12 when pivoted to its collapsed position.

The operation of the device is basically a two-step operation. (Note that FIGS. 2A. 4 and 7 illustrate holders 2, 2' after second telescoping member 18 has been moved from an extended condition back to a partially retracted condition.) By pulling outer end 36 of frame 12, second telescoping member 38 is first partially extended from housing 10 until flange 27 engages stop 23. Additional relative movement between first and second telescoping members 16, 18 is thereby prevented. In the second step of operation, which occurs as outer end 36 continues to be pulled the cooperation between stop 23 and flange 27 pulls first telescoping member 16 from within housing 10. Guides 26 and 29 begin to slide along guides 24 and guide pins 28 move in slots 30 until the guide pins abut the ends 31 of slots 30. At that time, the frame is in its fully operational condition as shown in FIGS. 2B and 3.

When second telescoping member 18 is fully extended, central open area 22 is sized for receipt of container 20 of the largest range of lateral sizes. This forms a circular central open area 22.

Bottom support 38 moves from a generally horizontal, stored position as seen in FIG. 6 to a generally vertically oriented, support position as shown in FIG. 2B as frame 12 moves from its retracted position to its operational position.

As can be seen in FIGS. 3–5, housing 10 has a lengthwise dimension shorter than that of frame 12 when frame 12 is in its fully extended position. That is, because second telescoping member 18 first slides along first telescoping member 16, the lengthwise dimension of frame 12 in its operational position, as shown in FIG. 2B, is longer than the lengthwise dimension of frame 12 in its retracted position, as shown in FIG. 5. Thus, housing 10 is shorter than fully extended frame 12 by the distance which second telescoping member 18 slides along first telescoping member 16. This distance is indicated in FIG. 4 by dimension d.

FIG. 7 illustrates an alternate embodiment in which generic beverage container holder 2' may simultaneously receive a plurality of containers. As illustrated in FIG. 7, generic container holder 2' includes housing 10' for receiving frames 12' and 12" Frames 12' and frames 12" may be independently operable as shown in FIG. 3, or may be formed integrally so as to move together.

In either of the embodiments, once frame 12 is in its operational position, frame 12 may then be partially collapsed such that second telescoping member 18 is retracted into housing 10 as shown in FIG. 2A in order to receive a container 20 smaller than central open area 22. When it is desired to return frame 12 to its fully retracted position, second telescoping member 18 is further collapsed into housing 10 which, in turn, causes first telescoping member 16 to return to its collapsed position and bottom support 3B to return to its horizontal, stored position until frame 12 is fully retracted in housing 10 as illustrated in FIG. 5.

Modifications and variations can be made to the disclosed embodiments without departing from the subject of the invention as defined in the following claims. For example, frame 12 could be constructed of three or more telescoping members. Second telescoping member 18 could be constructed to be totally external of housing 10 when frame is in its operational position.

What is claimed:

1. A generic container holder, usable with containers over a range of lateral sizes, for mounting to a surface comprising:

a housing mountable to said surface;

a frame mounted to said housing for movement between a retracted position, wherein said frame is within said housing, and an operational position, wherein said frame extends from said housing, said frame having a portion defining a central open area for receiving said containers;

said frame including first and second telescoping members for moving between an extended condition and a collapsed condition as said frame moves between said retracted and operational positions, each of said first and second telescoping members having a peripheral edge;

said central opening being formed by the peripheral edges of said first and second telescoping members.

2. The generic container holder as defined by claim 1 wherein said telescoping members are relatively independently slidable.

3. The generic container holder as defined by claim 1 wherein the range of lateral sizes includes a largest lateral size and wherein said central open area is sized for receipt of the container having the largest lateral size over the range of lateral sizes when said first and second telescoping members are fully extended.

4. The generic container holder as defined by claim 1 wherein said first and second telescoping members include means for defining a variably dimensioned central opening.

5. The generic container holder as defined by claim 1 further comprising a bottom support mounted to and depending from said frame, a part of said bottom support positioned centrally beneath said central open area when said frame is in the operational position, such that said containers placed in said central open area are supported vertically by said bottom support.

6. The generic container holder as defined by claim 1 wherein said frame defines at least two central open areas adapted to simultaneously receive a plurality of containers.

7. The generic container holder as defined by claim 6 wherein each of said central open areas is adapted to receive one container.

8. The generic container holder as defined by claim 1 further comprising guides for said movement between said frame and said housing.

9. The generic container holder as defined by claim 1 wherein said first telescoping member is slidably mounted to said housing and wherein said first telescoping member acts as a cantilever to support said second telescoping member when said frame is in said operational position.

10. The generic contain holder of claim 9 wherein said second telescoping member is partially external of the housing when the frame is in the operational position.

11. A generic container holder usable with containers over a range of lateral sizes for mounting to a surface comprising:
   a housing having a lengthwise dimension and mountable to said surface;
   a frame having a length, said frame slidably mounted to said housing for movement between a retracted position, wherein a portion of said frame is within said housing, and an operational position, wherein said portion of said frame is removed from said housing, said frame having a central open area for receiving said containers;
   said frame including a plurality of elements relatively slidable in a lengthwise direction, said central open area being formed by said plurality of elements, said elements moving between extended and collapsed conditions as said frame moves from said operational to said retracted positions such that said lengthwise dimension of said housing is substantially shorter than the length of said frame when said elements are in said extended condition.

12. The generic container holder as defined by claim 11 wherein said plurality of elements each include a peripheral edge and wherein said central open area is formed by the peripheral edges of said plurality of elements.

13. A generic container holder usable with containers over a range of lateral sizes, including a largest lateral size, for mounting to a surface comprising:
   a housing mountable to said surface;
   a frame slidably mounted to said housing for movement between a retracted position, wherein said frame is within said housing, and an operational position, wherein said frame is at least partially extended from said housing;
   said frame including first and second relatively slidable telescoping elements moving between extended and collapsed conditions as said frame moves between said operational and retracted positions.
   said frame having a central open area for receiving said container, said central open area sized for receipt of said container of the largest size when said first and second relatively slidable telescoping elements are fully extended, said central open area formed by said first and second relatively slidable telescoping elements;
   said first relatively slidable telescoping element slidably mounted to said housing;
   said second relatively slidable telescoping element slidably mounted to said first relatively slidable telescoping element such that said second relatively slidable telescoping element is supported by said first relatively slidable telescoping element when said first and second relatively slidable telescoping elements are in said extended position; and
   a bottom support mounted to and depending from said frame, a part of said bottom support positioned centrally beneath said central open area when said frame is in said operational position such that said containers placed in said central open area are supported vertically by said bottom support.

14. The generic container holder as defined by claim 13 wherein said first and second relatively slidable telescoping elements slide in a lengthwise direction;
   said housing and said frame each having a lengthwise dimension such that said lengthwise dimension of said housing is substantially shorter than the lengthwise dimension of said frame when said elements are in said extended condition.

15. A generic container holder, usable with containers over a range of lateral sizes, for mounting to a surface comprising:
   a housing mountable to said surface;
   a frame mounted to said housing for movement between a retracted position, wherein said frame is within said housing, and an operational position, wherein said frame extends from said housing, said frame having a portion defining a central open area for receiving said containers;
   said frame including a first telescoping member and a second telescoping member for moving between an extended condition and a collapsed condition as said frame moves between said retracted and operational positions, said first telescoping member slidable on said housing, said second telescoping member slidable on said first telescoping member, said first and second telescoping members having a first width and a second width, respectively, wherein said first width is less than said second width.

16. A generic container holder, usable with containers over a range of lateral sizes, for mounting to a surface comprising:
   a housing mountable to said surface;
   a frame mounted to said housing for movement between a retracted position, wherein said frame is within said housing, and an operational position, wherein said frame extends from said housing, said frame having a portion defining a central open area for receiving said containers;

said frame including a first telescoping member and a second telescoping member for moving between an extended condition and a collapsed condition as said frame moves between said retracted and operational positions, said first telescoping member slidable on said housing and said second telescoping member slidable on said first telescoping member, said second telescoping member including a pair of extensions laterally disposed about said first telescoping member.

17. The generic container holder as defined by claim 1 wherein said central open area is non-circular when said frame is in said collapsed condition.

* * * * *